(12) United States Patent
Shen et al.

(10) Patent No.: US 11,568,888 B2
(45) Date of Patent: Jan. 31, 2023

(54) TERMINAL CONTROL METHOD, TERMINAL AND NON-TRANSITORY COMPUTER READABLE STORAGE MEDIUM

(71) Applicant: ZTE CORPORATION, Shenzhen (CN)

(72) Inventors: Shaowu Shen, Shenzhen (CN); Liting Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 378 days.

(21) Appl. No.: 16/892,159

(22) Filed: Jun. 3, 2020

(65) Prior Publication Data

US 2020/0294533 A1    Sep. 17, 2020

Related U.S. Application Data

(63) Continuation of application No. PCT/CN2018/125011, filed on Dec. 28, 2018.

(30) Foreign Application Priority Data

Dec. 28, 2017    (CN) .......................... 201711466427.0

(51) Int. Cl.
*G10L 25/78* (2013.01)
*G06F 3/16* (2006.01)
(Continued)

(52) U.S. Cl.
CPC ................ *G10L 25/78* (2013.01); *G06F 3/03* (2013.01); *G06F 3/043* (2013.01); *G06F 3/16* (2013.01);
(Continued)

(58) Field of Classification Search
CPC .......... G06F 3/03; G06F 3/0346; G06F 3/043; G06F 3/0433; G06F 3/16
See application file for complete search history.

(56) References Cited

U.S. PATENT DOCUMENTS 6,014,573 A * 1/2000 Lehtonen ............ H04M 1/0245
455/569.1
2005/0212758 A1 * 9/2005 Marvit .................... G06F 3/017
345/156
(Continued)

FOREIGN PATENT DOCUMENTS

CN    101276514 A    10/2008
CN    103049090 A    4/2013
(Continued)

OTHER PUBLICATIONS

ZTE Corporation, CN First Office Action with English translation, CN201711466427.0, dated Apr. 25, 2022, 10pgs.
(Continued)

*Primary Examiner* — Shaun Roberts

(57) ABSTRACT

A terminal control method, a terminal and a non-transitory computer-readable storage medium are provided. The terminal control method includes: receiving, by a microphone, a detection audio signal emitted from a speaker and having a frequency within a pre-set detection frequency range; acquiring actual audio parameters of the detection audio signal when being received by the microphone, and original audio parameters of the detection audio signal when being emitted from the speaker; determining a relative state between the microphone and the speaker according to the actual audio parameters and the original audio parameters; determining a terminal control operation to be performed, according to the relative state and a pre-set correspondence between relative states and terminal control operations; and
(Continued)

performing the determined terminal control operation on a terminal where the microphone is located.

18 Claims, 9 Drawing Sheets

(51) Int. Cl.
G10L 25/54 (2013.01)
G06F 3/043 (2006.01)
G06F 3/03 (2006.01)
(52) U.S. Cl.
CPC ........ *G10L 25/54* (2013.01); *G10L 2025/783* (2013.01)

(56) References Cited

U.S. PATENT DOCUMENTS

| | | | | |
|---|---|---|---|---|
| 2006/0132431 | A1* | 6/2006 | Eliezer | G06F 1/1616 345/156 |
| 2008/0009310 | A1* | 1/2008 | Rhoads | G06F 3/0317 455/550.1 |
| 2009/0265671 | A1* | 10/2009 | Sachs | G06F 3/0346 715/863 |
| 2010/0083373 | A1* | 4/2010 | White | G06F 3/017 726/21 |
| 2012/0282976 | A1* | 11/2012 | Suhami | G10K 11/17857 381/314 |
| 2013/0108083 | A1 | 5/2013 | Cheng et al. | |
| 2013/0154919 | A1* | 6/2013 | Tan | G06F 3/03 345/156 |
| 2015/0063587 | A1 | 3/2015 | Park et al. | |
| 2015/0194145 | A1* | 7/2015 | Chen | G06F 3/038 345/156 |
| 2015/0200638 | A1 | 7/2015 | Ko et al. | |
| 2016/0323672 | A1* | 11/2016 | Bhogal | H04R 5/04 |

FOREIGN PATENT DOCUMENTS

| | | |
|---|---|---|
| CN | 103116976 A | 5/2013 |
| CN | 103379194 A | 10/2013 |
| CN | 103645848 A | 3/2014 |
| CN | 103645869 A | 3/2014 |
| CN | 103718574 A | 4/2014 |
| CN | 105045385 A | 11/2015 |
| CN | 105094298 A | 11/2015 |
| CN | 105246015 A | 1/2016 |
| CN | 105388458 A | 3/2016 |
| CN | 105785353 A | 7/2016 |
| CN | 106056061 A | 10/2016 |
| CN | 106484359 A | 3/2017 |
| WO | WO 2019/129230 A1 | 7/2019 |

OTHER PUBLICATIONS

International Search Report, PCT/CN2018/125011, dated Apr. 1, 2019, 4 pgs.

* cited by examiner

TERMINAL CONTROL METHOD, TERMINAL AND NON-TRANSITORY COMPUTER READABLE STORAGE MEDIUM

CROSS-REFERENCES TO RELATED APPLICATION

The present application is a continuation of PCT Application No. PCT/CN2018/125011, filed Dec. 28, 2018, entitled "Terminal Control Method, Terminal and Computer-Readable Storage Medium," which claims priority to Chinese Patent Application No. 201711466427.0, filed Dec. 28, 2017, the entirety of each of which is incorporated herein by reference.

TECHNICAL FIELD

The present disclosure relates to the technical field of terminals, in particular to a terminal control method, a terminal and a non-transitory computer-readable storage medium

BACKGROUND

The application environment for mobile terminals is becoming more and more complex, and requirements by the industry and users on intelligent performance of the terminals are becoming higher and higher. Conventional control on a terminal is generally achieved by performing a touch operation on a touch screen when the touch screen is lit, but controlling the terminal through the touch operation is cumbersome and the control efficiency is low.

SUMMARY

The present disclosure provides a terminal control method, a terminal and a non-transitory computer-readable storage medium, which realizing control on the terminal without performing any touch operation on the touch screen, and thus the operation is simple and the control efficiency is improved.

The present disclosure provides a terminal control method including:

receiving, by a microphone, a detection audio signal emitted from a speaker and having a frequency within a pre-set detection frequency range;

acquiring actual audio parameters of the detection audio signal when being received by the microphone, and original audio parameters of the detection audio signal when being emitted from the speaker;

determining a relative state between the microphone and the speaker according to the actual audio parameters and the original audio parameters;

determining a terminal control operation to be performed, according to the relative state and a pre-set correspondence between relative states and terminal control operations; and performing the determined terminal control operation on a terminal where the microphone is located.

The present disclosure also provides a terminal which includes a processor, a memory and a communication bus. The communication bus is configured to implement communication between the processor and the memory. The processor is configured to execute at least one program stored in the memory to implement the terminal control method as described above.

The present disclosure also provides a non-transitory computer-readable storage medium storing at least one program, the at least one program being executable by at least one processor to implement the terminal control method as described above.

DETAILED DESCRIPTION

The present disclosure will now be described through the specific embodiments with reference to the accompanying drawings. The specific embodiments described herein are described merely for illustrating but not intended to limit the present disclosure.

Sometimes, the user may wish to operate the terminal in other ways for some reasons. For example, in some occasions, the user may not be able to directly click the pictures and buttons on the screen, and thus he/she may wish to enable a certain function of the terminal by not clicking on the touch screen; in some occasions, for example, when the power of the terminal is insufficient, in order to save the power, the user may wish to perform operations that are normally performed on a bright screen, without lighting the screen of a Liquid Crystal Display (LCD).

Embodiment One

In this embodiment, a terminal control method is provided, in which the user may implement terminal control by not clicking on the touch screen. For example, the user may initiate a relative movement between the speaker and the microphone through certain operations, such as changing the relative position between the speaker that emits the detection audio signal and the microphone that receives the detection audio signal (or achieve an effect similar to the relative movement), so that there is a difference between the detection audio signal received by the microphone and the original detection audio signal emitted by the speaker. The relative movement between the speaker and the microphone is reversely deduced according to the difference, thereby controlling the terminal where the microphone is located to perform a corresponding terminal control operation.

Figure 1:
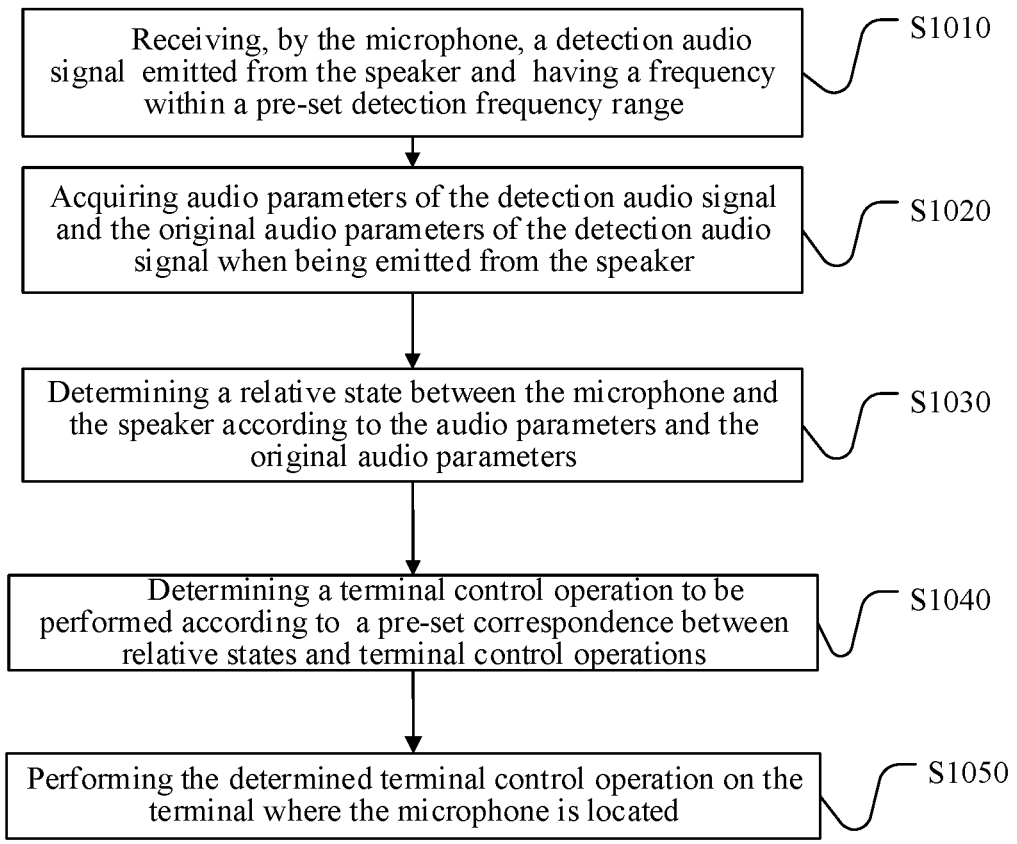
FIG. 1 is a basic flow chart of a terminal control method according to an embodiment.

As shown in FIG. 1, the terminal control method of the present embodiment includes steps S1010, S1020, S1030, S1040 and S1050.

In S1010, a detection audio signal emitted from a speaker and having a frequency within a pre-set detection frequency range is received a microphone.

In this embodiment, the speaker is configured to emit audio signals, and the microphone is configured to receive audio signals, and the number of speakers is not limited in this embodiment. Generally, an audio codec chip or the like is also connected to a circuit at the back end of the microphone in the terminal, so as to detect the audio signal received by the microphone, thereby acquiring a detection audio signal that satisfies a pre-set frequency.

In this embodiment, variation of the detection audio signal may be used to determine the relative state between the speaker and the microphone. The relative state may be configured to indicate a certain relationship between the microphone and the speaker when the microphone and the speaker are stationary, for example, the certain relationship may be a relative position relationship, such as a distance between the microphone and the speaker on different terminals, an angle between the microphone and the speaker on the same terminal in a stationary state, etc. The relative state may also be configured to indicate a relative movement between the microphone and the speaker when at least one of the microphone and the speaker moves; for example, the relative movement may include the microphone and the speaker on different terminals moving away from each other or moving close to each other, the microphone and the speaker on the same terminal moving away from each other or moving close to each other, etc. Therefore, the relative state in this embodiment includes the relatively stationary state and relative movement between the microphone and the speaker. The relative state includes the relatively stationary state and relative movement. In order to ensure the accuracy of determination on the relative state, a detection audio signal has to be selected. In practice, audio signals of 20 hertz (Hz)-18 kilohertz (KHz) could be normally heard by human ears, while audio signals with frequencies greater than 18 KHz are inaudible to the human ears. In order to prevent audible sound from being generated when controlling the terminal where the microphone is located to perform terminal control operations and thus interfering with the user, in this embodiment, audio signals that are inaudible to the human ear are selected, such as, 7 groups of higher frequency signals with frequencies of 18 KHz, 19 KHz, 20 KHz, 21 KHz, 22 KHz, 23 KHz, 24 KHz etc. In one embodiment, since the frequency shift is proportional to the original frequency at which the speaker emits the audio signal, a higher frequency (such as a frequency of 20-24 KHz) may be selected as an emitting frequency for emitting the detection audio signal in this embodiment, so that the audio signals received by the microphone may have larger frequency shift. However, considering that the relative movement between the speaker and the microphone will generate a frequency offset, in order to prevent the circuit at the back end of the microphone from filtering out valid detection audio signals that are slightly out of the range of 20-24 KHz, a range for pre-set detection frequency may be obtained by slightly extending an upper limit and a lower limit of a selected range for emitting frequency at which the detection audio signals is emitted. For example, the selected range for emitting frequency is 20-24 KHz, and the range for pre-set detection frequency is (20−0.5)−(24+0.5) KHz. In an embodiment, a waveform of sound wave of the detection audio signal is determined according to user settings or terminal settings. In this embodiment, the waveform of the sound wave includes but is not limited to a sine wave, a square wave, a saw tooth wave, or the like.

In this embodiment, in order to realize reception of the detection audio signal, a circuit connected to the microphone may adjust audio demodulation parameters to a range of less than 20 Hz or greater than 18 KHz. In an embodiment, the audio demodulation parameters may also be adjusted to the aforementioned pre-set range for detection frequency, such as the aforementioned (20−0.5)−(24+0.5) KHz, so as to perform more accurate audio demodulation.

In S1020, audio parameters of the detection audio signal and original audio parameters of the detection audio signal when being emitted from the speaker are acquired.

In this embodiment, the audio parameters of the detection audio signal include actual audio parameters of the detection audio signal when being received by the microphone, including but not limited to an actual frequency, an actual amplitude and reception time of the detection audio signal; the original audio parameters of the detection audio signal includes original audio parameters of the detection audio signal when being emitted from the speaker, including but not limited to an original frequency, an original amplitude, and emitting time of the detection audio signal.

In an embodiment, since the signal characteristics of the sound waveform in the time domain are not obvious, the fast Fourier algorithm is employed, and an audio time domain signal received by the microphone is filtered first and then converted into a frequency domain signal, and then certain operations, such as filtering and sampling, etc., are performed on the converted signal.

In an embodiment, the speaker emits a sound wave with a fixed frequency, and due to the external environment interference or other noise interference, the signal of the sound wave received by the microphone may have burrs, that is, a clutter signal of other frequencies. Therefore, in order to increase the accuracy of the subsequent determination on the relative state, filtering has to be performed on the frequency signal converted from the audio signal received by the microphone, so as to extract a valid identifiable frequency signal. In this embodiment, the filtering may be realized by adding multiple sets of band-pass filters, and the range for reception frequency of the band-pass filters may be set as the above-mentioned range for pre-set detection frequency. For example, the band-pass filter may only receive signals of 18 KHz-24 KHz, and signals of less than 18 KHz and more than 24 KHz will be filtered out. In this embodiment, external environmental frequency noises are filtered out, and irregular frequency noises out of a threshold range are removed, such that the actual frequency of the detection audio signal can be extracted based on the filtered frequency domain signal. In an embodiment, in order to increase the accuracy of the extracted frequency, the frequency may be extracted from the signal twice or more times.

When performing sampling, the sampling frequency may be set to double frequency, triple frequency or N times frequency according to the user's requirement on sensitivity detection, which is not limited in this embodiment. Common mobile phones support audio sampling rates of 8, 26, 32, 44 and 48 KHz. The default maximum sampling rate that can be supported is 48 KHz and the maximum audio frequency that can be supported is 24 KHz. In this embodiment, initially, the terminal where the microphone is located performs sampling with the default sampling frequency, and if the collected data is insufficient or cannot be identified, the sampling frequency will be automatically increased. In one example, if the default sampling frequency works, a down-sampling may be adopt to shorten the calculation time for sampling. In addition, a frequency resolution may be obtained according to F/N. The larger the number of points N, the higher the resolution of the sampling, by increasing the number of sampling points N.

In S1030, a relative state between the microphone and the speaker is determined according to the audio parameters and the original audio parameters.

The relative state in this embodiment includes a relatively stationary state and a relative movement. The relative movement may actually occur or it may be a virtual relative movement simulated by the user through other operations performed on the terminal (for example, the interference caused by the audio signal emitted from the speaker). In this embodiment, the speaker and the microphone may be disposed on the same terminal or may be disposed on different terminals, which is not limited in this embodiment. The terminal where the speaker or microphone is located includes mobile phone, tablet, smart phones ring, laptop or desktop computer, etc., but it is not limited thereto.

Figure 2:
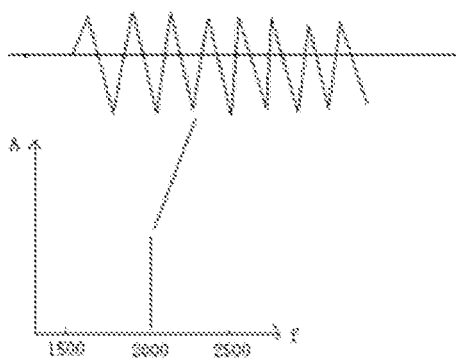
FIG. 2 is a schematic diagram illustrating a frequency fluctuation of an audio signal of 2 kHz when an acoustic source and a receiver are relatively stationary according to an embodiment.
Figure 3:
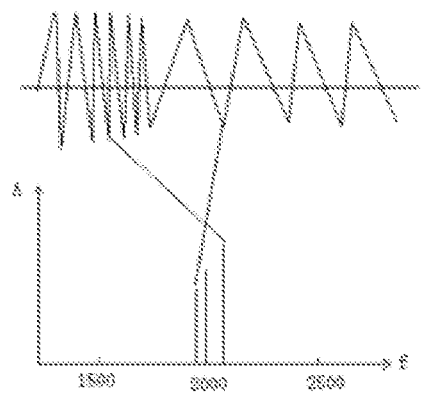
FIG. 3 is a schematic diagram illustrating the frequency fluctuation of the audio signal of 2 kHz in FIG. 2 when the acoustic source and the receiver move relatively to each other.

The relative movement between the sound wave source and the receiver will affect the frequency of the audio signal received by the receiver. FIG. 2 illustrates the frequency of an audio signal of 2 KHz when the sound wave source and the receiver are relatively stationary. FIG. 3 illustrates variation of the sound wave frequency when the sound wave source and the receiver move relatively to each other. As shown in FIG. 3, when the sound wave source and the receiver move towards each other, since the sound wave source approaches the receiver, the number of sound wave pulses received by the receiver per unit time will increase, the wavelength of the sound wave will be compressed, and thus the wavelength will be decreased and the frequency will be increased (frequency greater than 2 KHz in FIG. 3); when the sound wave source and the receiver move away from each other, since the sound wave source is far away from the receiver, the number of sound wave pulses received by the receiver per unit time will decrease, and the wavelength of the sound wave will be stretched and thus the wavelength will be increased and the frequency will be decreased (frequency less than 2 KHz). Therefore, it can be determined whether the sound wave source and the receiver move close to each other or move away from each other, at least based on the frequency variation of the audio signal received by the receiver.

Based on the above principle, the speaker generates a low frequency audio signal or high frequency audio signal with a certain frequency, and the microphone receives and demodulates the signal. When the speaker and the microphone move relatively to each other, the frequency of the audio waveform received by the microphone will change.

In an embodiment, when the speaker and the microphone on the terminal move close to each other, due to the Doppler effect, the frequency of the audio signal received by the microphone will be increased as compared with the frequency of the audio signal emitted from the speaker. When the speaker and the microphone on the terminal move away from each other, due to the Doppler effect, the frequency of the audio signal received by the microphone will be decreased as compared with the frequency of the audio signal emitted from the speaker.

In this embodiment, it can be at least determined whether the microphone and the speaker move close to each other or away from each other, according to the audio parameters and the original audio parameters of the detection audio signal.

In S1040, a terminal control operation to be performed is determined according to the relative state and a pre-set correspondence between relative states and terminal control operations.

To realize a sensitive control to the terminal in this embodiment, corresponding relative states are set in advance for multiple terminal control operations. After the relative state is identified in S1030, the terminal control operation may be directly obtained according to the pre-set correspondence.

In this embodiment, the terminal control operations may be different depending on to the type of the terminal. Taking that the terminal where the microphone is located is a mobile phone as an example, the terminal control operations of the mobile phone include basic functions of mobile phones, for example, setting states such as muting, vibration and flight mode, etc., initiating a camera mode or video mode for the front and rear cameras, or initiating and establishing wireless functions of Bluetooth, Wireless-Fidelity (WI-FI), and Global Positioning System (GPS), initiating split screen function of the mobile phone, or adjusting the sound or screen brightness. The terminal control operation of the mobile phone also includes operations on some applications of the mobile phone, such as popping up application interfaces for applications such as WeChat, QQ etc., downloading preview songs, etc., which is not limited in this embodiment. In one example, the terminal control operation may be an operation implemented only on the terminal, or an operation that needs to be performed interactively with the terminal where the speaker is located, which is not limited in this embodiment.

In S1050, the determined terminal control operation is performed on the terminal where the microphone is located.

In this embodiment, there are two situations for the terminal where the speaker and the microphone are located: one is that the speaker and the microphone are disposed on the same terminal, and the other is that the speaker and the microphone are disposed on different terminals.

Firstly, how to implement terminal control is discussed below based on the scenario that the microphone and the speaker are disposed on the same terminal. For ease of description, the same terminal is referred to as a terminal to be controlled. The relative state in S1030 is the relative state between the speaker and the microphone on the terminal to be controlled.

In this scenario, determining the relative state between the microphone and the speaker according to the audio parameters and the original audio parameters in S1030 includes: determining the relative state between an area where the microphone is located and an area where the speaker is located on the terminal to be controlled, according to the audio parameters and the original audio parameters; performing the determined terminal control operation on the terminal where the microphone is located includes: performing the determined terminal control operation on the terminal to be controlled.

Now taking that the terminal to be controlled is a non-foldable terminal as an example, the audio parameters include an actual frequency of the detection audio signal when being received by the microphone, and the original audio parameters include an original frequency of the detection audio signal when being emitted from the speaker. As is well known, when the microphone and the speaker move close to each other, the frequency of the audio signal received by the microphone is greater than that of the audio signal emitted from the speaker; and when the microphone and the speaker move away from each other, the frequency of the audio signal received by the microphone is smaller than that of the audio signal emitted from the speaker. The actual relative position between the microphone and the speaker on the unfoldable terminal generally does not change, therefore, in this embodiment, the relative movement between the microphone and the speaker on the unfoldable terminal is a virtual relative movement resulting from manual intervention.

Determining the relative state between an area where the microphone is located and an area where the speaker is located on the terminal to be controlled, according to the audio parameter and the original audio parameter includes: if the actual frequency of the detection audio signal is lower than the original frequency of the detection audio signal, determining that the relative state between the area where the microphone is located and the area where speaker is located is a virtual state of being away from each other; and if the actual frequency of the detection audio signal is greater than the original frequency of the detection audio signal, determining that the relative state between the area where the microphone is located and the area where speaker is located is a virtual state of being close to each other.

Figure 4:
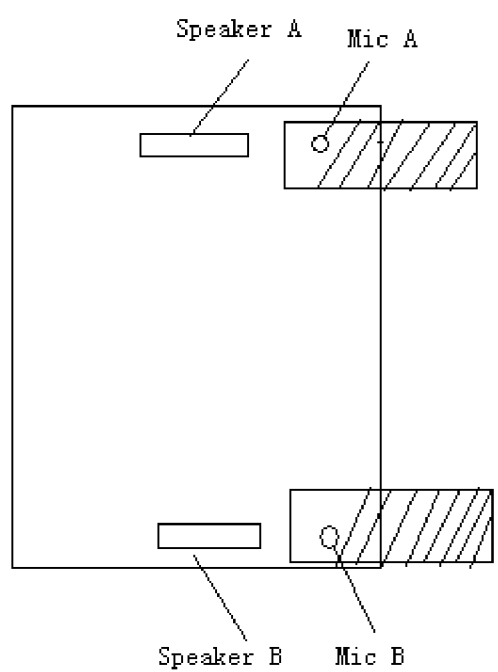
FIG. 4 is a schematic diagram illustrating a virtual relative movement between a microphone and a speaker on a non-foldable terminal to be controlled according to an embodiment, in which the virtual relative movement is realized by interfering with the microphone.

There may be a plurality of speakers and/or microphones on the non-foldable terminal to be controlled. The number and installation positions of the speakers and microphones are not limited in this embodiment. The virtual relative movement of the terminal to be controlled is realized by manual intervention. For example, as shown in FIG. 4, a microphone (Mic) A and a speaker A are provided on the top of the non-foldable terminal, and a Mic B and a Speaker B are provided on the bottom. The shadow in FIG. 4 indicates manual intervention on the Mic A and the Mic B performed by human hands. This manual intervention may cause variation of the frequency of the audio signal received by Mic when being compared with the frequency of the audio signal emitted from the speaker, which is equivalent to a folding operation or an unfolding operation of the foldable terminal. For example, if the manual intervention increases the frequency of the audio signal received by the Mic as compared with the frequency of the audio signal emitted from the speaker, the relative state between the area where the microphone is located and the area where the speaker is located is a virtual state of being close to each other, which is equivalent to the folding operation of the foldable terminal; and if manual intervention decreases the frequency of the audio signal received by the Mic as compared with the frequency of the audio signal emitted from the speaker, the relative state between the area where the microphone is located and the area where the speaker is located is a virtual state of being away from each other, which is equivalent to the unfolding operation of the foldable terminal. In the process of usage, the speaker A is triggered to emit an audio signal of a specific frequency, and the Mic A and Mic B receive the audio signal simultaneously. When the Mic A and Mic B are blocked by a finger or an action is performed on them, the audio signal received by the two Mic will be changed. Through the variation of the audio signal or the difference between the signals received by the two Mic, the terminal to be controlled are controlled to call for different functions corresponding thereto or switch the display interface (for example, LCD interface) and display the switched display interface. Similarly, there may also be a user intervention above the two speakers, which is not limited in this embodiment.

Now taking that the terminal to be controlled is a non-foldable terminal as an example, the foldable property may be realized by a flexible screen or a folding component of the terminal, and the number of display screens of the foldable terminal is not limited. For example, the foldable terminal may be a terminal with a flexible screen or a dual-screen folding terminal such as a dual-screen folding mobile phone.

On a foldable terminal to be controlled, at least a pair of speaker and microphone are respectively provided on two sides of the foldable portion of the terminal to be controlled. If the foldable terminal to be controlled is a flexible screen terminal, a pair of speaker and microphone are provided at least at the top and bottom of the terminal to be controlled respectively; and if the foldable terminal to be controlled is a dual-screen folding terminal, at least a pair of speaker and microphone are provided on two sides of the foldable portion respectively. In an embodiment, in the case that the terminal to be controlled is a foldable terminal, the above-mentioned relative state between the area where the microphone is located and the area where the speaker is located may be regarded as the relative state between the two sides of the foldable portion of the terminal to be controlled.

In S1010 above, the microphone receiving the detection audio signal emitted from a speaker and having a frequency within a pre-set detection frequency range includes: receiving, by the microphone, the detection audio signal emitted from the speaker located on the terminal to be controlled and having a frequency within the pre-set detection frequency range. To identify the relative state between the two sides of the foldable portion, the above-mentioned speakers include at least one speaker on a side of the foldable portion different from the side where the microphone is located. In an embodiment, the frequencies of the detection audio signals emitted from different speakers are different so as to avoid interference.

In order to increase the accuracy for detecting the relative state, the number of pairs of speakers and microphones on the two sides of the foldable portion of the terminal to be controlled may be increased.

Figure 5:
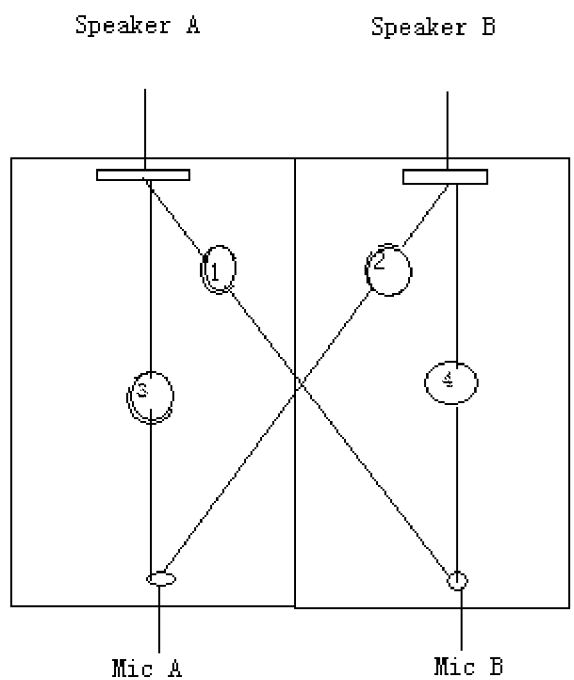
FIG. 5 is a schematic diagram illustrating several groups of audio detection performed by a plurality of speakers and microphones on a dual-screen folding terminal according to an embodiment.

In the following, in conjunction with FIG. 5, the detection performed by multiple pairs of microphones and speakers will be illustrated by taking that the terminal to be controlled is a dual-screen folding terminal as an example. As shown in FIG. 5, the dual-screen folding terminal has two screens, and the Speaker A and the Mic A, and the Speaker B and the Mic B are respectively provided on the top and bottom of the two screens. When there are a plurality of speakers or Mics on the terminal, different detection groups may be formed from different microphones and speakers, and different detection functions may be set for the different detection groups. As shown in FIG. 5, the speakers and microphones may be divided into 1-4 detection groups to detect the detection audio signal, and the terminal operations are controlled according to the detected detection audio signal. A pair of microphone and speaker in the first group and a pair of microphone and speaker in the second group on the terminal of FIG. 5 are located on the two sides of the foldable portion of the terminal to be controlled respectively, and two sets of audio parameters may be provided for identifying the relative states between the two sides of the foldable portion, thereby increasing the accuracy of determination on the relative state (relative movement or relatively stationary state) between the two sides of the foldable portion of the terminal to be controlled. In one example, the speakers and microphones located on the same side of the foldable portion (such as the third group and the fourth group) may detect other state information of the terminal by detecting audio parameters of the audio signal, thereby controlling other functions of the terminal. The other state information and the functions corresponding thereto may be determined according to the user's settings or the default settings of the terminal. For example, if it is detected through the third group and the fourth group that the user performs a shaking operation on the terminal, the display interface for WeChat is started.

In this embodiment, constituent components involved when setting the complexity of the relative state and the relative movement for the relative state in the pre-set correspondence between the relative states and the terminal control operations may be determined according to the number of terminal control operations that the user wants to trigger through the relative states.

In one example, the relatively stationary state includes a relatively stationary state determined based on an angle between the two sides of the foldable portion when the two sides of the foldable portion are relatively stationary. For example, the angle between the two sides of the foldable portion on the terminal to be controlled is 180 degrees, or the angle between the two sides of the foldable portion on the terminal to be controlled is 90 degrees, etc.

Figure 6:
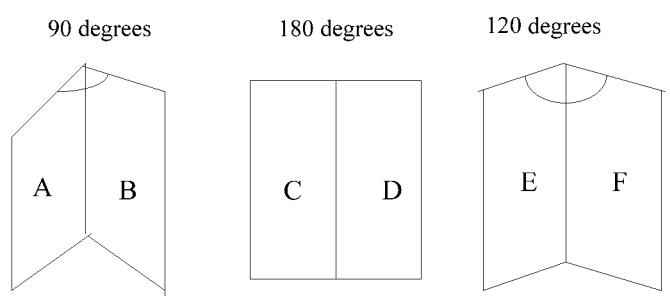
FIG. 6 is a schematic diagram illustrating a correspondence between folding angles and display interfaces of a foldable terminal according to an embodiment.

The relatively stationary state is defined by an angle, and the number of the corresponding terminal control operations is relatively small, but the operations performed by the user are simple and it is also convenient for the user to remember the correspondence between the folding angles and the terminal control operations. In this embodiment, the terminal control operations may include the various operations described above. In one embodiment, switching of the display interface of the terminal to be controlled may be controlled by different folding angles in the relatively stationary state. For example, as shown in FIG. 6, when the user unfolds a dual-screen folding terminal (in another example, it may also be a flexible screen terminal) to a certain angle, the two screens will display different contents. As shown in FIG. 6, interfaces A and B are displayed when the angle between the two screens is 90 degrees, interfaces C and D are displayed by switching when the angle is 180 degrees, and interfaces E and F are displayed by switching when the angle is 120 degrees. In addition, the angle between the two sides of the foldable portion of the terminal to be controlled may be converted into the distance between the pair of speaker and the microphone on the two sides of the foldable portion on the terminal to be controlled or vice versa.

In another example, the components for relative movement include, but are not limited to, the direction of relative movement, the relative speed, etc. If the number of the terminal control operations is small, for example, if the number of the terminal control operations is two, the relative movement may be set to be very simple, and the relative movement may be directly set as unfolding and folding the two sides of the foldable portion. However, if the number of the terminal control operations is large, it is necessary to increase the components for the relative movement.

In an embodiment, in the pre-set correspondence between the relative states and the terminal control operations, the relative movements include: a relative movement determined based on a direction of relative movement between the two sides of the foldable portion (the directions of relative movement include unfolding or folding); and the relative movement determined based on a combination of the direction of relative movement between the two sides of the foldable portion and at least one of the following: the angle between the two sides of the foldable portion, the relative speed of the two sides of the foldable portion, and the number of times the two sides of the foldable portion move relatively to each other in the direction of relative movement.

In an embodiment, in the pre-set correspondence between the relative states and the terminal control operations, the relative movement may be set in at least the following ways.

1. A relative movement determined based on the direction of relative movement between the two sides of the foldable portion, the direction of relative movement including the unfolding and folding the two sides of the foldable portion of the foldable terminal.

2. A relative movement determined based on the direction of relative movement between the two sides of the foldable portion and the angle between the two sides of the foldable portion, such as unfolding to 120 degrees, folding to 60 degrees, etc.

3. A relative movement determined based on the direction of relative movement between the two sides of the foldable portion and the relative speed of the two sides of the foldable portion, for example, unfolding quickly, folding quickly, unfolding slowly, and folding slowly, etc.

4. A relative movement determined based on the direction of relative movement between the two sides of the foldable portion and the number of times the two sides of the foldable portion move relatively to each other in the direction of relative movement, for example, consecutively unfolding for two times, consecutively folding for three times, and folding for one time after unfolding for one time.

5. A relative movement determined based on the direction of relative movement between the two sides of the foldable portion, the angle between the two sides of the foldable portion, and the number of times the two sides of the foldable portion move relatively to each other in the direction of relative movement, for example, consecutively unfolding 90 degrees for two times, or consecutively folding 30 degrees for three times from an unfolding state of 180 degrees, or unfolding 120 degrees for one time and then folding 90 degrees, or folding 90 degrees for two times and then unfolding 120 degrees for one time, etc.

6. A relative movement determined based on the direction of relative movement between the two sides of the foldable portion, the angle between the two sides of the foldable portion, and the relative speed of the two sides of the foldable portion, for example, quickly unfolding to 80 degrees, slowly folding to 120 degrees, etc.

7. A relative movement determined based on the direction of relative movement between the two sides of the foldable portion, the number of times the two sides of the foldable portion move relatively to each other in the direction of relative movement, and the relative speed of the two sides of the foldable portion, for example, quickly folding for two times, quickly unfolding for two times, etc.

8. A relative movement determined based on the direction of relative movement between the two sides of the foldable portion, the angle between the two sides of the foldable portion, the number of times the two sides of the foldable portion move relatively to each other in the direction of relative movement, and the relative speed of the two sides of the foldable portion, for example, consecutively and quickly unfolding to 90 degrees for two times, or consecutively and quickly folding 30 degrees for three times from an unfolded state of 180 degrees, etc.

In this embodiment, the above-mentioned components constituting the relative movement may be obtained by detecting the detection audio signal.

In this embodiment, the audio parameters of the detection audio signal include the actual frequency, actual amplitude, and reception time of the detection audio signal when being received by the microphone; the original audio parameters of the detection audio signal include: the original frequency, original amplitude, and emitting time of the detection audio signal when being emitted.

When determining the relative state between the two sides of the foldable portion based on the audio parameters and the original audio parameters, the relatively stationary state and the relative movement may be identified in the following ways.

Firstly, acquiring, from detection audio signals, a detection audio signal emitted from a speaker on a side of the foldable portion different from different from the side where the microphone is located, and taking the acquired detection audio signal as a first detection audio signal. If there is only one pair of microphone and speaker, the received detection audio signal may be directly taken as the first detection audio signal. Considering that if multiple pairs of microphones and speakers are provided on the terminal to be controlled, the detection audio signals received by the microphone may include detection audio signals emitted from a speaker on the same side of the foldable portion as the microphone. In this embodiment, the first detection audio signal is acquired through the above steps for the accuracy of determination.

1. The direction of relative movement between the two sides of the foldable portion is determined according to the original frequency and the actual frequency of the first detection audio signal, or according to the variation of the actual amplitude of the first detection audio signal.

Figure 7:
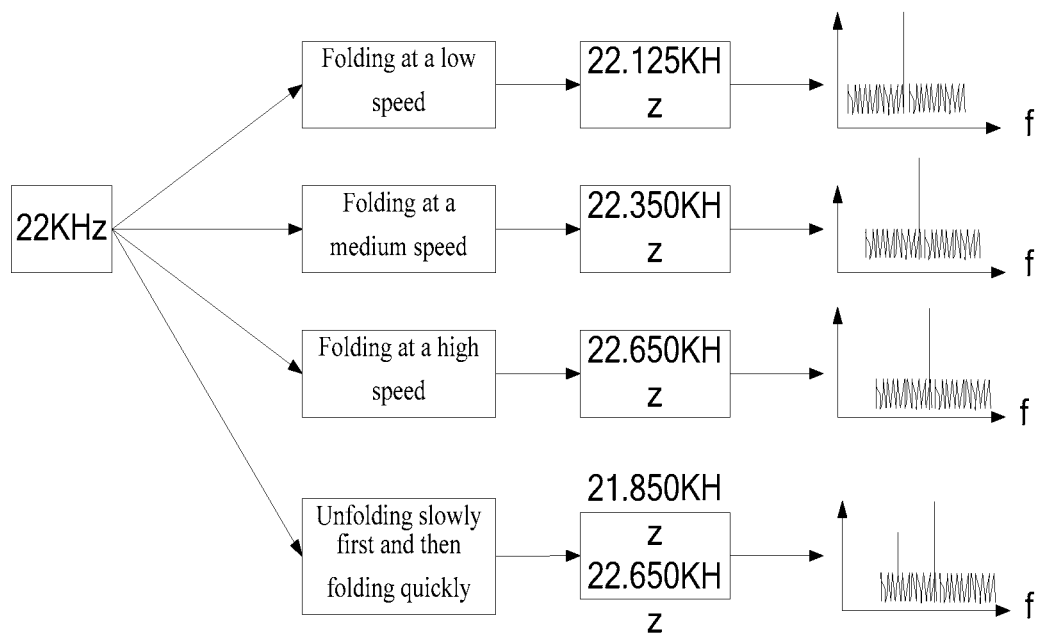
FIG. 7 is a schematic diagram illustrating detection results for frequency offset of a detection audio signal with an original frequency of 22 kHz, in the case that two sides of the foldable portion of the foldable terminal have different relative speeds, according to an embodiment.

Referring to FIG. 7, taking a detection audio signal with an original frequency of 22 KHz as an example, the detection results for frequency offset when the relative speeds are different are shown in FIG. 7.

As shown in FIG. 7, when the two sides of the foldable portion are being folded, the actual frequency of the detection audio signal increases as compared with the original frequency, and when the two sides of the foldable portion are being unfolded, the actual frequency of the detection audio signal decreases as compared with the original frequency, therefore, whether the two sides of the foldable portion are being unfolded or folded may be determined from the original frequency and the actual frequency of the first detection audio signal.

According to a rule that the longer the transmission distance is, the greater the amplitude attenuation of the audio signal is, it is known that if the two sides of the foldable portion are being folded, the actual amplitude of the received first detection audio signal gradually increases; on the contrary, if the two sides of the foldable portion are being unfolded, the actual amplitude of the received first detection audio signal gradually decreases. Therefore, whether the two sides of the foldable portion are being unfolded or folded may be determined from whether the actual amplitude of the first detection audio signal gradually increases or decreases.

2. The angle between the two sides of the foldable portion is determined according to the emitting time and the reception time of the first detection audio signal, or according to the actual amplitude and the original amplitude of the first detection audio signal.

In practice, it is commonly known that the sound speed is fixed. Under the circumstance that the terminal itself does not move relative to the external environment, if the angle between the two sides of the foldable portion is changed, the time for the sound to be emitted from the speaker on one side of the foldable portion to the microphone on the other side is changed. Since the positions of the speaker and microphone on the terminal are fixed, a linear distance from the speaker to the microphone may be calculated according to the time for the sound to be emitted from the speaker to the microphone, and an angle between planes where the speaker and the microphone are located (that is, the angle between the two sides of the foldable portion) may be obtained according to the linear distance and the positions of the speaker and the microphone on the terminal. In another scheme, when the angle between the two sides of the foldable portion is changed, the time for the first detection audio signal to be emitted from the speaker to the microphone may be collected firstly. A model for correspondence between the time as mentioned above and the angle (i.e. the angle between the two sides of the foldable portion) is acquired. In the process of audio detection, the transmission time is determined according to the emitting time and the reception time of the first detection audio signal, and then the transmission time is compared with the previous correspondence model and thus the angle between the two sides of the foldable portion is obtained by calculation.

In a similar way, the angle between the two sides of the foldable portion may be determined by using the actual amplitude and the original amplitude of the first detection audio signal. Firstly, the actual amplitude of the first detection audio signal emitted from the speaker to the microphone is collected when the angle between the two sides of the foldable portion is changed; then an amplitude attenuation is determined from the actual amplitude and the original amplitude; a correspondence model for the correspondence between the amplitude attenuation and the angle between the two sides of the foldable portion is then determined; and when the angle between the two sides of the foldable portion needs to be calculated in the audio detection process, the actual amplitude, the original amplitude, and the above-mentioned correspondence model are acquired, so as to obtain the angle between the two sides of the foldable portion.

The above method may be adopted to calculate the angle between the two sides of the foldable portion in a relatively stationary state and in relative movement. However, the calculation accuracy is higher in a relatively stationary state.

In an embodiment, in order to increase the accuracy for measuring the angle between the two sides of the foldable portion (in a relatively stationary state), the audio signal may be emitted and received multiple times between the speaker and the microphone, and the time for the signal being transmitted between the speaker and the microphone may be measured multiple times, and then the average of the measured time is obtained. For example, the time Δt for transmitting acoustic pulses N times may be calculated and divided by the number of acoustic pulses N, so as to obtain the average transmission time of a single pulse, and then a test value of the average transmission time corresponding to different angles between the two sides of the foldable portion may be stored as the model value.

3. A relative speed of the two sides of the foldable portion is determined according to the difference between the original frequency and the actual frequency of the first detection audio signal, or according to a rate of the actual amplitude variation of the first detection audio signal.

In one example, the relative speed of the two sides of the foldable portion may be determined according to the difference between the original frequency and the actual frequency of the first detection audio signal. The relative speed may be a relative speed level, such as fast and slow, or the relative speed may be a specific value.

As can be seen from FIG. 7, when performing folding at a low speed, the actual frequency of the detection audio signal with an original frequency of 22 KHz is 22.125 KHz, and thus the frequency offset of the detection audio signal corresponding to the folding at the low speed is 0.125 KHz. In accordance with FIG. 7, when performing folding at a medium speed, the frequency offset corresponding thereto is 0.350 KHz; and when performing folding at a high speed, the frequency offset corresponding thereto is 0.650 KHz. A similar rule may be applied to the frequency offset values when performing unfolding. Therefore, the greater the frequency offset value is, the higher the relative speed is for both the two directions for relative movement. Thus, in this embodiment, the relative speed of the two sides of the foldable portion is determined according to the difference between the original frequency and the actual frequency of the first detection audio signal.

In one example, the relative speed may be divided into multiple speed levels in advance, such as the above-mentioned three levels: low speed, medium speed and high speed, and corresponding different ranges for frequency offset value may be set for each level (in one example, different ranges for frequency offset value do not overlap with each other). When a frequency offset value is determined according to the difference between the original frequency and the actual frequency of the first detection audio signal in the audio detection process, the relative speed level may be determined according to the pre-set ranges for frequency offset value. In some embodiments, the speed may also be divided into two levels, four levels, etc. However, considering the user's experience, it is generally reasonable to divide it into three levels or less.

In an embodiment, if the two sides of the foldable portion are being folded, the actual amplitude of the received first detection audio signal gradually increases; on the contrary, if the two sides of the foldable portion are being unfolded, the actual amplitude of the received first detection audio signal gradually decreases. The greater the speed of folding (or unfolding) is, the more the actual amplitude increases (or decreases). Therefore, the amplitude of the relative speed on the two sides of the foldable portion may be determined according to the rate at which the actual amplitude increases or decreases.

4. The number of times the two sides of the foldable portion move relatively to each other in a direction of relative movement is determined according to the number of times that the actual frequency of the first detection audio signal becomes greater or smaller as compared with the original frequency of the first detection audio signal, or according to the number of times that the actual amplitude of the first detection audio signal increases or decreases.

Referring to FIG. 7, according to the data in the last line of FIG. 7, it can be seen that when the two sides of the foldable portion are unfolded slowly first and then folded quickly, the actual frequency of the detection audio signal having the original frequency of 22 KHz decreases as compared with the original frequency first, and then increases as compared with the original frequency. Based on this rule, in this embodiment, the number of times that the actual frequency of the detection audio signal decreases as compared with the original frequency is the number of times for unfolding the two sides of the foldable portion, and the number of times that the actual frequency increases as compared with the original frequency is the number of times for folding the two sides of the foldable portion.

Similarly, the number of times that the actual amplitude of the first detection audio signal increases is the number of times for folding the two sides of the foldable portion, and the number of times that the actual amplitude of the first detection audio signal gradually decreases is the number of times for unfolding the two sides of the foldable portion. For example, if the actual amplitude of a first detection audio signal varies following a rule that the amplitude firstly increases, then decreases, then increases and then decreases again, the number of times that the actual amplitude increases will be 2, and the number of times for folding the two sides of the foldable portion will be 2; and the number of times that the actual amplitude decreases will be 2, and the number of times for unfolding the two sides of the foldable portion will be also 2.

In this embodiment, an order in which the two sides of the foldable portion are folded and unfolded may be obtained, according to an order in which the actual amplitude of the first detection audio signal increases and decreases; and, an order in which the two sides of the foldable portion are folded and unfolded can be obtained, according to an order in which the actual frequency of the first detection audio signal becomes greater or smaller.

In this embodiment, the above method for obtaining the angle between the two sides of the foldable portion, the relative speed of the two sides of the foldable portion, the number of times the two sides of the foldable portion move relatively to each other in the direction of relative movement, and the direction of the relative movement between the two sides of the foldable portion obtained according to the detection audio signal are only for illustration, which does not constitute a limitation for the method for obtaining the relative state between the two sides of the foldable portion according the actual audio parameters and the original audio parameters of the detection audio signal in this embodiment.

In the following, a foldable terminal to be controlled performing a terminal control operation according to a folding operation performed on the terminal by a user will be described in conjunction with FIGS. 8 to 10.

Figure 8:
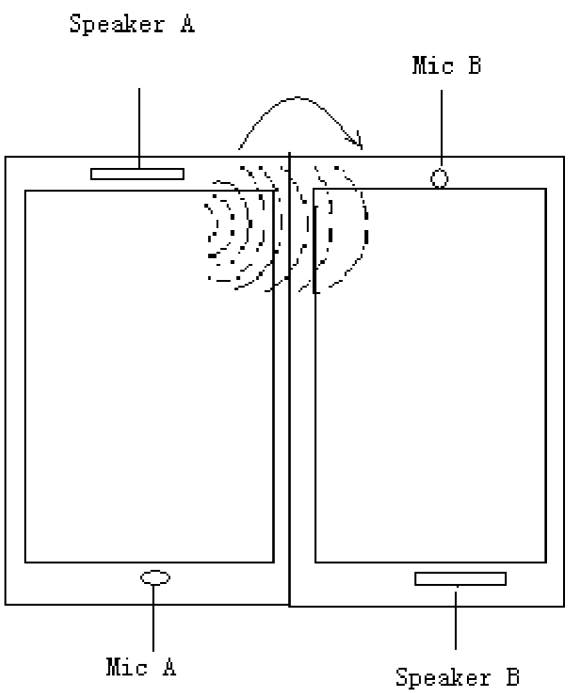
FIG. 8 is a schematic diagram illustrating propagation of the detection audio signal when the speaker and the Mic (microphone) are placed respectively at the top and bottom of the dual-screen folding terminal, according to an embodiment.

FIG. 8 a schematic diagram illustrating the transmission of the detection audio signal when the speaker and the Mic (microphone) are disposed respectively at the top and bottom of the dual-screen folding terminal; in FIG. 8, the signal transmission route between the Speaker A and the Mic B (or the Speaker B and the Mic A) runs along a route parallel to a side of the terminal. Taking the Speaker A and the Mic B as an example, when the user is folding the dual-screen folding terminal, the Mic B receives a detection audio signal emitted from the Speaker A and having a frequency within the pre-set detection frequency range, and it is determined that the user performs an operation of folding the dual-screen folding terminal, according to that the actual frequency of the detection audio signal increases as compared with the original frequency of the detection audio signal when being transmitted, and then the terminal control operation corresponding to the folding action is performed on the dual-screen folding terminal. After the folding action is completed, the Mic B may also determine the time for the audio signal to transmit from the Speaker A to the Mic B after folding, by receiving the detection audio signal emitted from the Speaker A and having a frequency within the pre-set detection frequency range. Thereby, the distance from the Speaker A to the Mic B and the angle of the dual screen after folding is calculated. Similarly, the angle of the dual screen before folding may also be calculated in this way.

Figure 9:
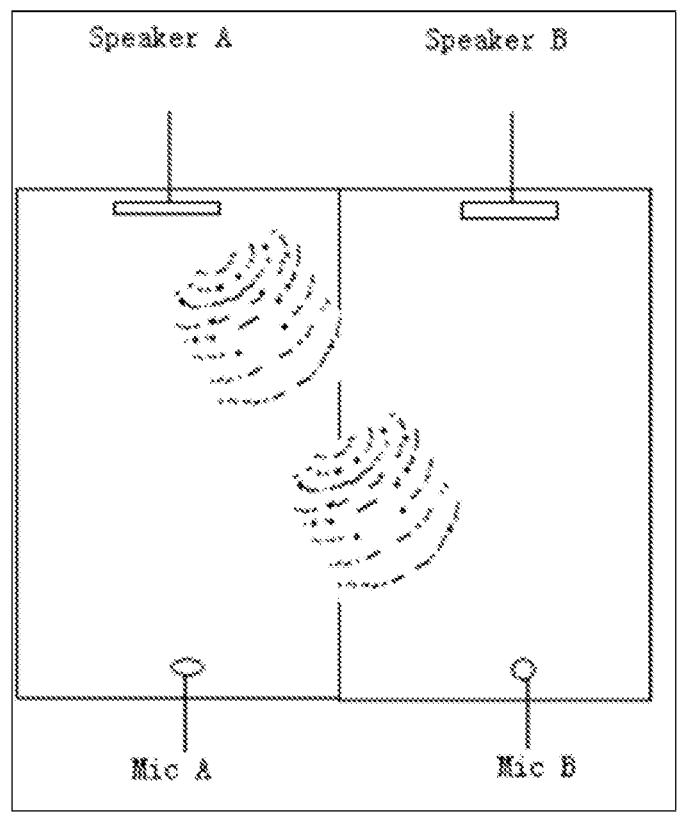
FIG. 9 is a schematic diagram illustrating diagonal propagation of the detection audio signal when the speaker and the Mic are placed on the same side of the dual-screen folding terminal, according to an embodiment.
Figure 10:
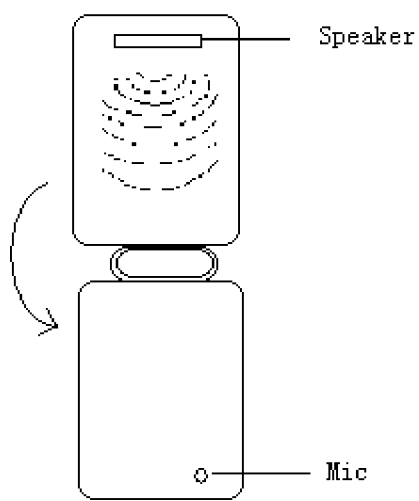
FIG. 10 is a schematic diagram illustrating detection for a folding movement state of a flip-phone according to an embodiment.

FIG. 9 is a schematic diagram illustrating a diagonal transmission of the detection audio signal when the speaker and the Mic are disposed on the same side of the dual-screen folding terminal, respectively. The terminal control is realized by detecting the relative movement according to the detection audio signal transmitted along a diagonal of the terminal. In FIG. 9, the signal transmission route between the Speaker A and the Mic B (or the Speaker B and the Mic A) runs along the diagonal of the terminal. Taking the Speaker A and the Mic B as an example, when the user is unfolding the dual-screen folding mobile phone, the Mic B receives the detection audio signal emitted by the Speaker A and having a frequency within the pre-set detection frequency range, and it is determined that the user performs an operation of unfolding the dual-screen folding terminal, according to that the actual frequency of the detection audio signal decreases as compared with the original frequency of the detection audio signal when being transmitted, and then the terminal control operation corresponding to the unfolding action is performed on the dual-screen folding terminal. After the unfolding action is completed, the Mic B may also determine the time for the audio signal to transmit from the Speaker A to the Mic B after unfolding, by receiving the detection audio signal emitted by the Speaker A and having a frequency within the pre-set detection frequency range. Thereby, the distance from the Speaker A to the Mic B and the angle of the dual-screen after unfolding is calculated. Similarly, the angle of the dual-screen before unfolding the dual-screen may also be calculated in this way.

The arrangement of the speaker and the microphone on a flexible screen terminal and the identification of the folding and unfolding actions are similar to that described for the above dual-screen folding terminal and thus the detailed description thereof will be omitted here. In this embodiment, the accuracy for identifying the folding action may also be increased by increasing the number of microphones and/or speakers.

One specific type of the foldable terminal may also be a flip phone. FIG. 10 is a schematic diagram illustrating detection for a folding or unfolding movement state of a flip-phone. The Speaker and the Mic on the flip phone are respectively disposed above the screen at the upper portion and the lower portion of the keyboard. In the process of unfolding or folding the folding phone with both upper and lower screens, the audio parameters of the detection audio signal emitted from the Speaker disposed above the screen at the upper portion and having a frequency within the pre-set detection frequency range and also received by Mic disposed at the lower portion of the keyboard will change with the variation of the folding direction, speed, angle and number of times. The content of the folding or unfolding action may be obtained according to the method described above. Different terminal control operations for the flip phone are displayed according to different folding actions, or the flip phone is controlled to enter into different screens.

In order to improve the user's familiarity with the correspondence between the relative states (i.e. the relative states between the two sides of the foldable portion of the terminal) and the terminal control operations in practice, the correspondence between the relative states (i.e. the relative states between the two sides of the foldable portion of the terminal) and the terminal control operation may be set by the user himself.

When the correspondence between the relative states and the terminal control operations is set in advance, the setting for the relative states between the two sides of the foldable portion includes: when the user performs a folding operation on the terminal to be controlled, the relative state between the two sides of the foldable portion on the terminal to be controlled is acquired in real time as the relative state in the above correspondence.

For example, when setting a relatively stationary state for a terminal control operation, the angle between the two sides of the foldable portion after the user operates the terminal to be controlled is acquired as a component of the relatively stationary state.

Alternatively, relative state parameters may be acquired by input of the user on a user input interface, so as to obtain the relative state in the correspondence.

Figure 11:
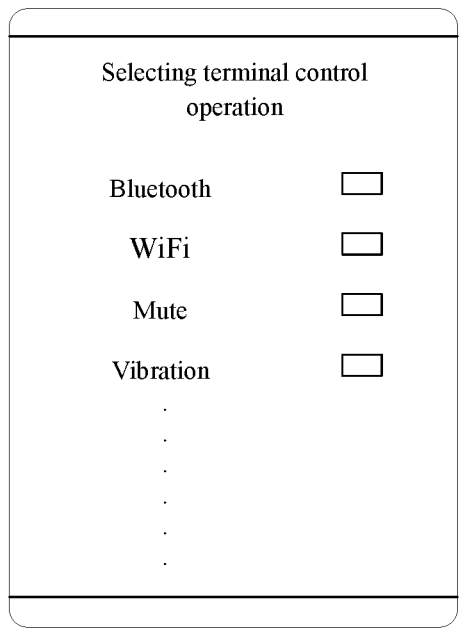
FIG. 11 is a schematic diagram illustrating a selection interface for a terminal control operation provided to a user according to an embodiment
Figure 12:
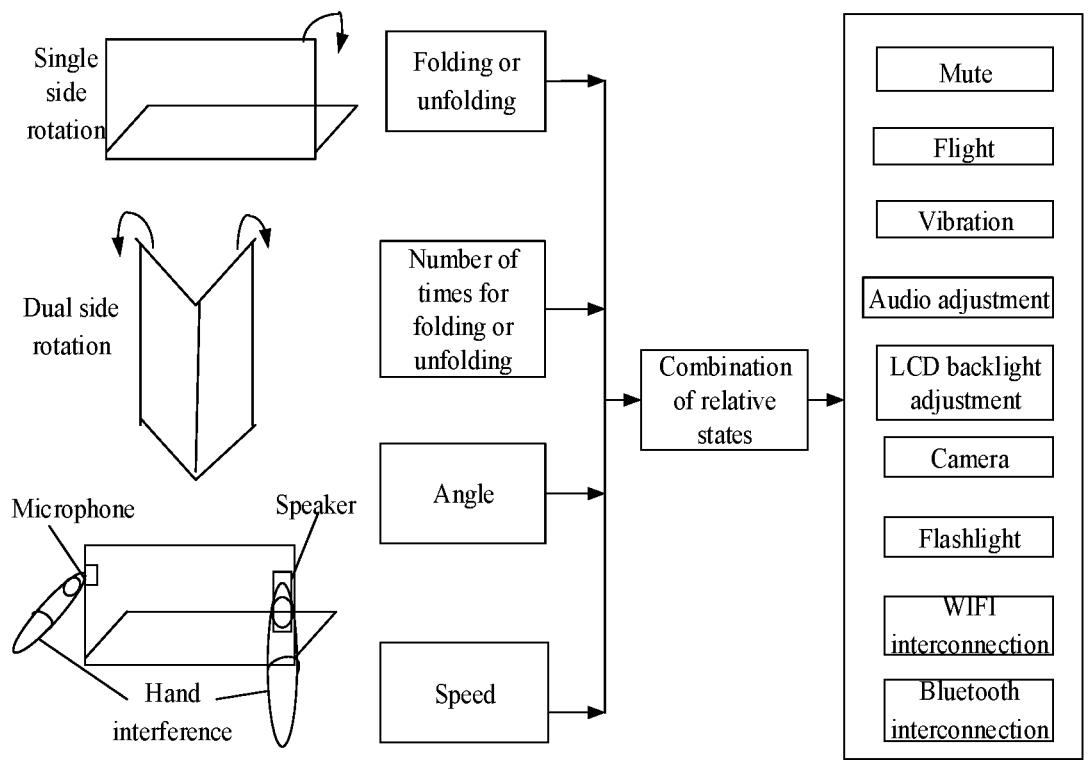
FIG. 12 is a schematic diagram illustrating combination of different action elements to obtain a relative state and selection of a relative state corresponding to the terminal control operation according to an embodiment.

In the latter setting way, the terminal may provide the user with a display interface shown in FIG. 11, thereby allowing the user to select a mobile phone function corresponding to the audio state detection. In an example with different action element combinations and terminal control operations shown in FIG. 12, the user may select most of the mobile phone functions by ticking as the terminal control operations corresponding to audio state detection, such as flight mode, mute, vibration, flashlight, volume adjustment, screen brightness adjustment, smart power saving, WI-FI, Bluetooth, GPS, Near Field Communication (NFC), initiating and shutting down data services, etc.

Figure 13:
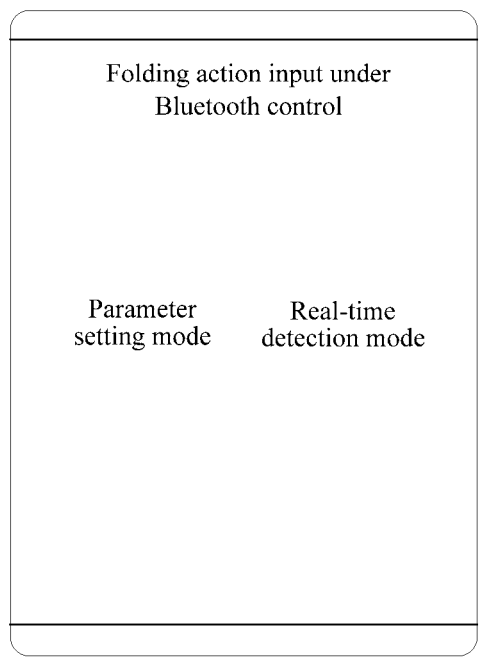
FIG. 13 is a schematic diagram illustrating an interface for selecting components for a folding action by input according to an embodiment.

After selecting a terminal control operation, the terminal may display, to the user, an input interface for inputting relative movements for each terminal control operation. An interface for selecting mode for inputting a folding action in FIG. 13 provides the user with two modes including parameter setting and real-time detection. In the parameter setting mode, the user may define the folding action by selecting components from the four shown in FIG. 12 (folding/unfolding, the number of times of folding/the number of times of unfolding, the angle between the two sides of the foldable portion, and the relative speed of the two sides of the foldable portion). In one example, if the relatively stationary state for the terminal control operation is set by using the parameter setting mode, only the angle between the two sides of the foldable portion may be set. In the real-time detection mode, the user folds or unfolds the terminal, and the terminal detects the folding action, and then the mapping from the folding action to the terminal control operation is performed.

In addition, in one example, the correspondence between the relative states of the two sides of the foldable portion and the terminal control operations may also be provided to the user based on the default settings of the terminal.

In the following, the way for implementing terminal control when the microphone and speaker are disposed on different terminals will be illustrated.

According to the contents of the embodiments described previously, the microphone and the speaker may disposed on different terminals. The terminal where the speaker is located may be referred to as an emitting terminal, and the terminal where the microphone is located may be referred to as a receiving terminal. In an embodiment, the number of emitting terminals is one at least. In order to accurately detect the relative state between the emitting terminal and the receiving terminal, there may be provided a plurality of speakers by which an emitting terminal may transmit a detection audio signal. In order to facilitate distinction among the emitting terminals and in order to avoid interference, the frequencies of the detection audio signals emitted from different speakers are different.

In one example, the terminal control operation performed in S1050 includes an interactive operation between the receiving terminal and the emitting terminal. The interactive operation includes Bluetooth connection and data transmission, etc.

The following description are made by takes one emitting terminal as an example. When there are multiple emitting terminals, the control manner at the receiving terminal is similar.

In a scenario where the microphone and the speaker are disposed on different terminals, the relative state in the preset correspondence between relative states and terminal control operations includes relative movements and relatively stationary states.

The relative movements include: a relative movement determined based on a direction of relative movement between the receiving terminal and the emitting terminal, the direction of relative movement including moving close to each other and moving away from each other; and a relative movement determined based on a combination of the direction of relative movement between the receiving terminal and the emitting terminal and at least one of the following: the relative speed of the receiving terminal and the emitting terminal, and the number of times the receiving terminal and the emitting terminal move relatively to each other in the direction of relative movement.

In an embodiment, the relative movements include the following relative movements.

1. A relative movement determined based on a direction of relative movement between the receiving terminal and the emitting terminal, for example, the receiving terminal and the emitting terminal moving close to each other or moving away from each other.

2. A relative movement determined based on the direction of relative movement between the receiving terminal and the emitting terminal and the number of times for movements in the direction of relative movement, for example, the receiving terminal and the emitting terminal moving away from each other for one time and then moving close to each other, and then moving away from each other again.

3. A relative movement determined based on the direction of relative movement between the receiving terminal and the emitting terminal and the relative speed of the receiving terminal and the emitting terminal, for example, the receiving terminal and the emitting terminal moving away from each other quickly, and the receiving terminal and the emitting terminal moving close to each other quickly.

4. A relative movement determined based on the direction of relative movement between the receiving terminal and the emitting terminal, the number of times for movements in the direction of relative movement, and the relative speeds of the receiving terminal and the emitting terminal, for example, the receiving terminal and the emitting terminal moving away from each other quickly for one time, and then moving close to each other slowly for one time.

All of the relative states described above are relative movements. In one example, the relative state may also be a relatively stationary state. That is, the receiving terminal and the emitting terminal are relatively stationary.

In one example, the audio parameters of the detection audio signal include the actual frequency and the actual amplitude, and the original audio parameters of the detection audio signal include the original frequency. When determining a relative movement between the receiving terminal and the emitting terminal based on the audio parameters and the original audio parameters, the relative movement is determined according to the following method.

The direction of relative movement between the receiving terminal and the emitting terminal is determined according to whether the actual frequency becomes greater or smaller as compared with the original frequency. The actual frequency becoming greater indicates that the receiving terminal and the emitting terminal moves close to each other, and the actual frequency becoming smaller indicates that the receiving terminal and the emitting terminal moves away from each other.

The number of times the receiving terminal and the emitting terminal move relatively to each other in the direction of relative movement is determined according to the number of times that the actual frequency becomes greater or smaller as compared with the original frequency; or, the number of times the receiving terminal and the emitting terminal move relatively to each other in the direction of relative movement is determined according to the number of times that the actual amplitude increases or decreases. The detailed exemplary description thereof is similar to that described for the above foldable terminal, which will not be repeated here.

The relative speed of the receiving terminal and the emitting terminal is determined according to the difference between the actual frequency and the original frequency; or, the relative speed of the receiving terminal and the emitting terminal is determined according to a rate at which the actual amplitude increases or decreases. The detailed exemplary description thereof is similar to that described for the above foldable terminal, which will not be repeated here.

The technical solution for triggering an interactive operation between two mobile phones by a relative movement there between, when the speaker and the microphone are disposed on the two mobile phones respectively, is described below with reference to FIG. 14.

Figure 14:
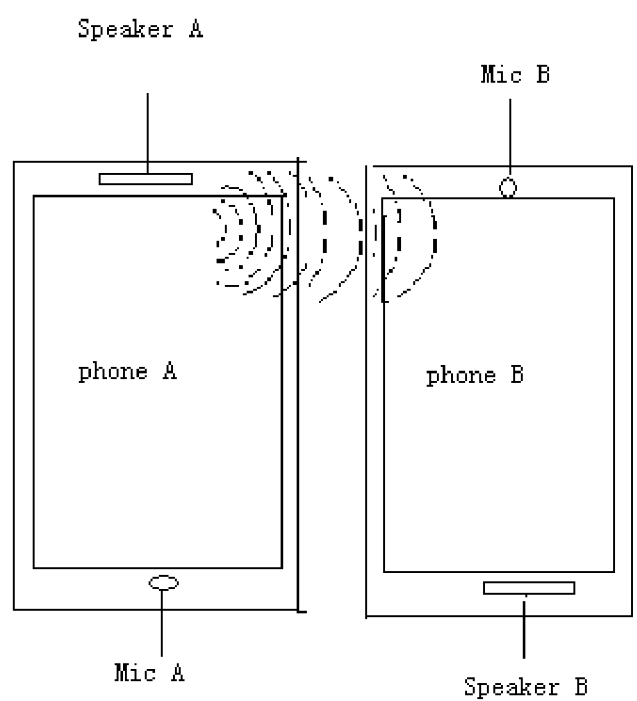
FIG. 14 is a schematic diagram illustrating a detection for the relative movement between the emitting terminal and the receiving terminal according to an embodiment.

As shown in FIG. 14, a Speaker A on a Phone A is triggered to emit an audio signal of a specific frequency (having a frequency within the pre-set detection frequency range), and a Mic B on a Phone B receives the audio signal at the same time. When the Phone B moves to the Phone A or moves away from the Phone A, the audio signal received by the Mic B will change. By comparing the variation of the audio parameter with a corresponding threshold of a parameter model, different function calls and interconnections between the two mobile phones corresponding thereto may be realized, such as connecting Bluetooth, WI-FI, file transfer, etc.

In practice, there are noises in the external environment. The noises may be environment noises or noises generated from other electronic devices. The frequency of these noises is likely to be within a pre-set range for detection frequency that we use previously. In order to prevent these noises from interfering with the audio detection process at S1010-S1030 in this embodiment and thus forming a false trigger to the terminal control operation, it is necessary to separate specific audio signals (generally high-frequency signals) generated by the speakers and suppress other interference signals at the same time. It is mainly realized through audio filtering components built within the terminal. When receiving audios, only the audio signals emitted from the speaker and having a frequency within a specific frequency range (a range that satisfies the pre-set detection frequency) are received. Considering that the distance between the speaker and the microphone in this embodiment is generally relatively short, the actual amplitude of the audio signal emitted from the speaker and received by the microphone is significantly different from the amplitudes of environmental noises and noises generated by other electronic products. Therefore, the actual amplitude factor may be taken into consideration in selecting the detection audio signal. In addition, when other devices are also emitting high-frequency signals and moving around, the frequency shift values will be different due to the difference in distances and angles. Since the distance between the microphone and the speaker is the shortest, the maximum Doppler frequency shift may be acquired. Therefore, the frequency shift values of multiple detection audio signals may be taken into consideration in selecting the detection audio signal.

The method further includes performing the following steps after the microphone receives the detection audio signal emitted from the speaker and having a frequency within the pre-set detection frequency range: determining whether the detection audio signal is a valid detection audio signal in at least one of the following ways.

Acquiring the actual amplitude of the detection audio signal, and when the actual amplitude of the detection audio signal is within a pre-set amplitude range, determining that the detection audio signal is a valid detection audio signal, and filtering out other audio signals whose amplitudes are out of the pre-set amplitude range.

Or, acquiring the frequency shift values of multiple detection audio signals, and taking the detection audio signal with the largest frequency shift value as the valid detection audio signal.

The first way above for determining valid detection audio signal is applicable to the foldable, the non-foldable terminal to be controlled, and is also applicable between the emitting terminal and the receiving terminal.

For the foldable terminal to be controlled, the distance between the speaker and the microphone is fixed when the foldable terminal is folded along a fixed folded portion. It means that the actual amplitude range of the audio signal emitted from the speaker is fixed when the audio signal reaches the microphone (in the absence of obstacles). Therefore, in one example, in a scenario where the speaker and the microphone are disposed on the same terminal and the same terminal is a foldable terminal to be controlled, the speaker of the terminal to be controlled emits the detection audio signal at a fixed amplitude, and the pre-set amplitude range is an actual amplitude range of the detection audio signal when being received by the microphone, under a plurality of folding angles of the terminal to be controlled.

The maximum value of the pre-set amplitude range is the actual amplitude of the detection audio signal (which is transmitted at a fixed amplitude) as being received by the microphone, when the distance between the speaker and the microphone is the shortest. The minimum value of the pre-set amplitude range is the actual amplitude of the detection audio signal (which is transmitted at a fixed amplitude) as being received by the microphone, when the distance between the speaker and the microphone is longest. The amplitude range in other scenarios may be obtained in a similar manner.

In the second way above for determining valid detection audio signal, since only one detection audio signal is selected as the valid detection audio signal, there is only one scenario suitable for the speaker for transmitting the detection audio signal.

If the speaker and the microphone are always turned on for detecting emission and reception of audio signals, resources and power will be wasted, the battery life will be shortened, and the user experience will be degraded. Therefore, in this embodiment, before S1010, a trigger control strategy for triggering audio detection is required. According to the trigger control strategy, it is determined whether the speaker shall continuously transmit the detection audio signal, and whether the terminal where the microphone is located shall continuously perform acquiring, detecting, and calculation of the detection audio signal etc.

In one example, the trigger control strategy includes performing the following operations before determining whether the detection audio signal is a valid detection audio signal: detecting, when the microphone is in an off-state, whether an audio detection function of the terminal where the microphone is located is triggered to be enabled by a key operation, a gesture operation, or a touch operation. If it is detected that the audio detection function of the terminal where the microphone is located is triggered to be enabled by a key operation, a gesture operation, or a touch operation, the microphone is turned on to acquire the detection audio signal; and if it is not detected that the audio detection function of the terminal where the microphone is located is triggered to be enabled by a key operation, a gesture operation, or a touch operation, the microphone is not turned on; where, if the microphone and the speaker are disposed on the same terminal, the speaker and the microphone are simultaneously turned on.

In this embodiment, the key operation includes long-pressing a terminal function key for a certain period of time, such as long-pressing the volume plus button or the volume minus button; or the key operation includes a combination of different key operations and duration, such as pressing the volume plus key over a pre-set duration and then pressing the power button once.

The user terminal is generally provided with some sensors, such as gyroscopes or acceleration sensors, etc. These sensors will not work when the terminal is in a stationary state; and when the terminal moves, one or all of these sensors may start to work to acquire data. Therefore, it may be determined whether to trigger the microphone and the speaker to be turned on, according to whether these sensors are working and the data obtained during operation.

There is a situation in which the terminal moves but the user does not perform any operation on the terminal, for example, when the user holding the terminal is running, or the terminal is placed in a car. In such a case, the values detected by the multiple sensors are changed, but the values are changed continuously and relatively regularly. Thus, if the microphone receives the signals with the same frequency, it may be determined that the movement of the terminal is caused by movement outside instead of being caused by operations of the user.

Therefore, in another example, the trigger control strategy includes performing the following operations before determining whether the detection audio signal is a valid detection audio signal: monitoring whether a pre-set sensor of the terminal where the microphone is located is in operation or not; determining whether the movement of the terminal where the microphone is located is caused by a movement outside the terminal, according to the signal detected by the pre-set sensor; if the movement of the terminal where the microphone is located is caused by the movement outside the terminal, the microphone is not turned on, and if the movement of the terminal where the microphone is located is not caused by the movement outside the terminal, the microphone is turned on to acquire the detection audio signal; where, if the microphone and the speaker are disposed on the same terminal, the speaker and the microphone are simultaneously turned on.

In an embodiment, the pre-set sensor is a sensor capable of detecting whether the terminal is moving, including but not limited to gyroscopes, acceleration sensors, etc.

In an embodiment, determining whether the movement of the terminal where the microphone is located is caused by the movement outside the terminal, according to the signal detected by the pre-set sensor includes: if it is monitored that the pre-set sensor is in operation, acquiring the signals detected by the pre-set sensor; determining whether the signals are continuous and relatively regular; if the signals are continuous and relatively regular, it is determined that the movement of the terminal where the microphone is located is caused by the movement outside the terminal; if the signals are not continuous or irregular, it is determined that the movement of the terminal where the microphone is located is not caused by the movement outside the terminal.

By using the above method, the time for turning on the speaker and microphone so as to emit and receive audio detection signals is accurately determined. However, in order to avoid incorrectly turning on the speaker and the microphone to transmit the detection audio signal when the user is not operating the terminal, and thus wasting resources and reducing the endurance of the terminal, a preliminary detection process may be provided after turning on the microphone and the speaker. Firstly, the speaker is controlled to emit detection audio signals within a certain period of time, if it is detected that the detection audio signals do not have frequency offsets, the speaker and the microphone are turn off to reduce resource waste, and if a frequency offset is detected, the emission and reception of audio signals are continuously to be detected.

In an embodiment, before turning on the microphone and the speaker for detection, measures may be taken in advance so that the external noises will not interfere with the detection audio signals significantly. For example, it may be achieved by preventing the audio signal from having the same frequency as the external noises.

In this embodiment, a low-power sleep and wake-up algorithm may also be used to reduce energy consumption that would occur when the microphone and the speaker are always turned on. The low-power sleep and wake-up algorithm controls the microphone to wake up periodically to monitor if there is a detection audio signal emitted from the speaker and having a frequency within the pre-set detection frequency range. If a detection audio signal having a frequency within the pre-set detection frequency range is monitored, a formal audio detection begins. If no detection audio signal having a frequency within the pre-set detection frequency range is monitored, the microphone is turned off. Or, the low-power sleep and wake-up algorithm controls the microphone and the speaker disposed on the same terminal to be turned on at the same time, and the speaker emits a detection audio signal having a frequency within the pre-set detection frequency range. If the detection audio signal received by the microphone does not have a Doppler frequency shift, the speaker and the microphone are turned off directly; and if the Doppler frequency shift occurs, it will be determined whether the Doppler frequency shift is generated by the movement outside the terminal or the movement of the terminal itself.

In this embodiment, the method further includes performing the following steps before the detection audio signal is emitted by the speaker: acquiring environmental noises outside the speaker, if the frequencies of the environmental noises are partly coincide with the pre-set detection frequencies, a frequency different from the frequencies of the environment noises is selected from the pre-set detection frequencies as the frequency of the emitted detection audio signal.

With this embodiment, when folding the terminal, the folding action may be accurately determined through emitting and receiving a detection audio signal of a specific frequency, and then the terminal control operation corresponding to the folding action may be determined. The terminal control operation is performed on the dual-screen folding terminal, thereby the user does not need to light up or operate various software icons which are normally required when performing the conventional operation on the touch screen, and thus providing the user with a convenient non-touch terminal operation method, which improves the user experience.

Embodiment Two

Now taking a foldable dual-screen folding mobile phone as an example, a method in which a terminal control is implemented by detecting the folding operation of the dual-screen folding mobile phone through an audio signal is described with reference to the FIG. 15. Assuming that the upper and lower portions of each screen on the folding mobile phone are respectively provided with a speaker and a microphone, and a first speaker on one side of the first screen and a second microphone on one side of the second screen are a pair of detection components. The terminal control process will be illustrated in the following by taking the first speaker and the second microphone as an example.

Figure 15:
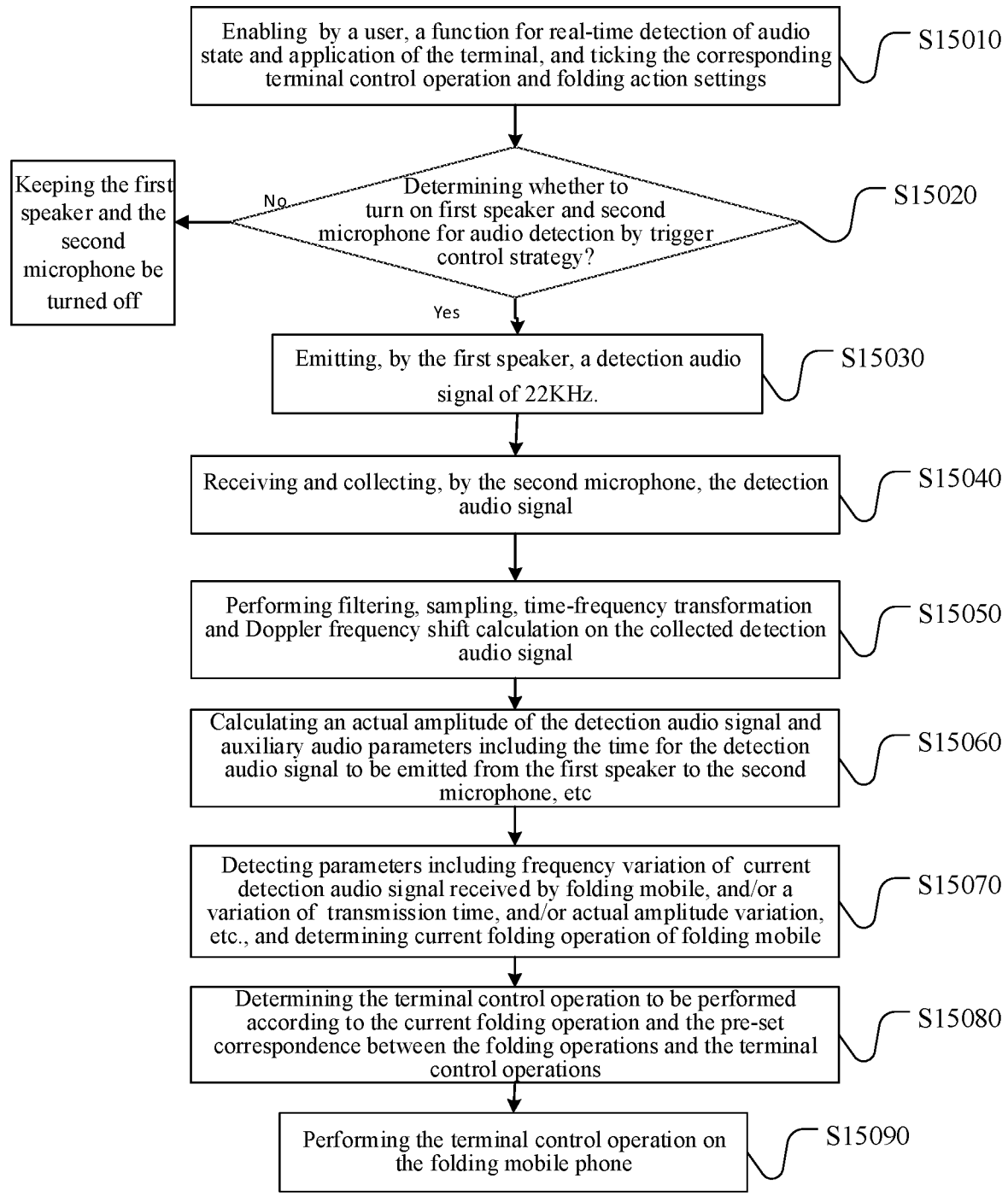
FIG. 15 is a flowchart illustrating another terminal control method according to another embodiment.

As shown in FIG. 15, the terminal control method includes the following steps in this embodiment.

At S15010, enabling a function for audio state real-time detection and application of the terminal, and ticking the corresponding terminal control operation and folding action settings, by the user.

At S15010, determining whether to turn on the first speaker and the second microphone for audio detection by using a trigger control strategy; if it is determined that the first speaker and the second microphone are turned on for audio detection, proceeding to S15030; if it is determined that the first speaker and the second microphone are not turned on for audio detection, keeping the first speaker and the second microphone be turned off.

The trigger control strategy has been described in the relevant description of the embodiment one.

At S15030, emitting, by the first speaker, a detection audio signal of 22 KHz.

At S15040, receiving and collecting, by the second microphone, the detection audio signal.

At S15050, performing filtering, sampling, time-frequency transformation and Doppler frequency shift calculation on the collected detection audio signal.

At S15060, calculating an actual amplitude of the detection audio signal and auxiliary audio parameters including the time for the detection audio signal to be emitted from the first speaker to the second microphone, etc.

At S15070, detecting parameters of the current detection audio signal received by the folding mobile phone, including a frequency variation and/or a transmission time variation, and/or an actual amplitude variation, etc., and determining the folding operation of the current folding mobile phone.

At S15080, determining the determined terminal control operation according to the current folding operation and the pre-set correspondence between the folding operation and the terminal control operation.

At S15090, performing the terminal control operation on the folding mobile phone.

With this embodiment, the user's folding action may be accurately determined through performing emission and reception of a detection audio signal having a specific frequency on the folding mobile phone, and then the terminal control operation corresponding to the folding action may be determined. The terminal control operation is performed on the dual-screen folding terminal, thereby the user does not need to light up or operate various software icons which are normally required when performing the conventional operation on the touch screen, and thus providing the user with a convenient non-touch terminal operation method, which improves the user experience.

Embodiment Three

Figure 16:
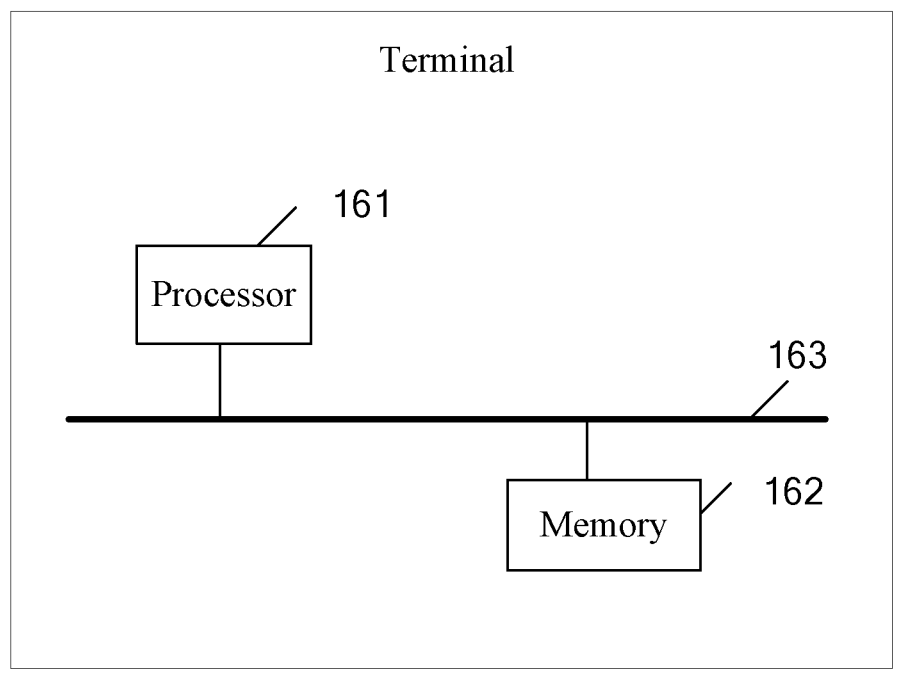
FIG. 16 is a diagram illustrating a hardware structure of a terminal according to an embodiment.

As shown in FIG. 16, in this embodiment, there is also provided a terminal including a processor 161, a memory 162, and a communication bus 163; the communication bus 163 is configured to perform connection communication between the processor 161 and the memory 162; the processor 161 is configured to execute at least one program stored in the memory 162 to implement the terminal control method described above.

In an embodiment, this embodiment also provides a non-transitory computer-readable storage medium that stores at least one program, and the at least one program may be executed by at least one processor to implement the terminal control method described above.

The at least one module or at least one step of the above-mentioned embodiments of the present disclosure may be implemented by a general-purpose computing device. The at least one module or at least one step may be integrated in a single computing device or distributed in a network composed of multiple computing devices. In an embodiment, the at least one module or at least one step may be implemented by a program code executable by the computing device, so that the at least one module or at least one step may be stored in a computer storage medium (Read-Only Memory (ROM)/Random Access Memory (RAM), magnetic disk, and optical disk) to be executed by the computing device, and in some cases, the illustrated or described steps may be executed in a different order from that described herein, or made into individual integrated circuit modules, or multiple modules or steps in the at least one module or at least one step may be made into a single integrated circuit module. Therefore, the present disclosure is not limited to any specific combination of hardware and software.

What is claimed is:

1. A terminal control method, comprising:
receiving, by a microphone, a detection audio signal emitted from a speaker and having a frequency within a pre-set detection frequency range;
acquiring actual audio parameters of the detection audio signal when being received by the microphone, and original audio parameters of the detection audio signal when being emitted from the speaker, wherein the actual audio parameters of the detection audio signal and the original audio parameters of the detection audio signal are configured to determine that the microphone and the speaker are close to each other or the microphone and the speaker are away from each other;
determining a relative state between the microphone and the speaker according to the actual audio parameters and the original audio parameters, wherein the relative state between the microphone and the speaker comprises a relatively stationary state and a relative movement state;
determining a terminal control operation to be performed, according to the relative state and a pre-set correspondence between relative states and terminal control operations; and
performing the determined terminal control operation on a terminal where the microphone is located.

2. The terminal control method according to claim 1, wherein,
the microphone and the speaker are on disposed on the same terminal, and the same terminal is a terminal to be controlled;
determining the relative state between the microphone and the speaker according to the actual audio parameters and the original audio parameters comprises: determining the relative state between the microphone and the speaker on the terminal to be controlled according to the actual audio parameters and the original audio parameters;
performing the determined terminal control operation on the terminal where the microphone is located comprises: performing the determined terminal control operation on the terminal to be controlled.

3. The terminal control method according to claim 1, wherein,
the microphone and the speaker are on disposed on different terminals, the terminal where the microphone is located is a receiving terminal, and the terminal where the speaker is located is an emitting terminal;
determining the relative state between the microphone and the speaker according to the actual audio parameters and the original audio parameters comprises: determining the relative state between the receiving terminal and the emitting terminal according to the actual audio parameters and the original audio parameters;
performing the determined terminal control operation on the terminal where the microphone is located comprises: performing the determined terminal control operation on the receiving terminal.

4. The terminal control method according to claim 2, wherein,
the terminal to be controlled is not foldable, the actual audio parameters comprise an actual frequency of the detection audio signal when being received by the microphone, and the original audio parameters comprise an original frequency of the detection audio signal when being emitted from the speaker;

determining the relative state between the microphone and the speaker on the terminal to be controlled according to the actual audio parameters and the original audio parameters comprises:

determining that the relative state between the microphone and the speaker is a virtual state of being away from each other, if the actual frequency of the detection audio signal is lower than the original frequency of the detection audio signal; and determining that the relative state between the microphone and the speaker is a virtual state of being close to each other, if the actual frequency of the detection audio signal is greater than the original frequency of the detection audio signal.

5. The terminal control method according to claim 2, wherein, the terminal to be controlled is foldable and comprises a plurality of speakers, and at least one of the speakers is provided on a side of a foldable portion of the terminal to be controlled different from the side where the microphone is located; the relative state between the microphone and the speaker on the terminal to be controlled is a relative state between two sides of the foldable portion on the terminal to be controlled;

receiving, by the microphone, the detection audio signal emitted from the speaker and having a frequency within the pre-set detection frequency range comprises: receiving, by the microphone, the detection audio signal emitted from at least one of the speakers located on the terminal to be controlled and having a frequency within the pre-set detection frequency range; and wherein detection audio signals emitted from different speakers have different frequencies.

6. The terminal control method according to claim 5, wherein, in the pre-set correspondence between the relative states and the terminal control operations, the relative states comprises: relatively stationary states and relative movements;

the relatively stationary states comprise: a relatively stationary state determined based on an angle between the two sides of the foldable portion if the two sides of the foldable portion are relatively stationary;

the relative movements comprises:

a relative movement determined based on a direction of relative movement between the two sides of the foldable portion, wherein, the direction of relative movement comprises unfolding or folding; and a relative movement determined based on a combination of the direction of relative movement between the two sides of the foldable portion and at least one of the following: an angle between the two sides of the foldable portion, a relative speed of the two sides of the foldable portion, and a number of times the two sides of the foldable portion move relatively to each other in the direction of relative movement.

7. The terminal control method according to claim 6, wherein, the actual audio parameters comprise actual frequency, actual amplitude and reception time; the original audio parameters comprise original frequency, original amplitude and emission time;

when determining the relative state between the two sides of the foldable portion according to the actual audio parameters and the original audio parameters, the relatively stationary states and the relative movements are identified based on the following:

acquiring, from detection audio signals, a detection audio signal emitted from the speaker located on the side of the foldable portion different from the side where the microphone is located as a first detection audio signal;

determining the direction of relative movement between the two sides of the foldable portion, according to the original frequency and the actual frequency of the first detection audio signal, or according to variation of the actual amplitude of the first detection audio signal;

determining the angle between the two sides of the foldable portion, according to the emission time and the reception time of the first detection audio signal, or according to the actual amplitude and the original amplitude of the first detection audio signal;

determining the relative speed of the two sides of the foldable portion, according to the difference between the original frequency and the actual frequency of the first detection audio signal, or according to a variation rate of the actual amplitude of the first detection audio signal; and determining a number of times the two sides of the foldable portion move relatively to each other in the direction of relative movement according to a number of times that the actual frequency of the first detection audio signal becomes greater or smaller as compared with the original frequency of the first detection audio signal, or according to a number of times that the actual amplitude of the first detection audio signal becomes greater or smaller.

8. The terminal control method according to claim 6, wherein when pre-setting the correspondence between relative states and terminal control operations, a manner for acquiring the relative state includes:

when a relative state corresponding to a terminal control operation is set and the terminal to be controlled performs a folding operation, acquiring the relative state between the two sides of the foldable portion of the terminal to be controlled as the relative state corresponding to the terminal control operation in the correspondence;

or, acquiring relative state parameters input from an input interface to obtain the relative state in the correspondence.

9. The terminal control method according to claim 3, wherein the terminal control operation includes an interactive operation between the receiving terminal and the emitting terminal.

10. The terminal control method according to claim 3, wherein relative states in the pre-set correspondence between relative states and terminal control operations include:

a relative movement determined based on a direction of relative movement between the receiving terminal and the emitting terminal, wherein, the direction of relative movement comprises moving close to each other and moving away from each other; and a relative movement determined based on a combination of the direction of relative movement between the receiving terminal and the emitting terminal and at least one of the following: a number of times the receiving terminal and the emitting terminal move relatively to each other in the direction of relative movement, and relative speed of the receiving terminal and the emitting terminal.

11. The terminal control method according to claim 10, wherein,
- the actual audio parameters include an actual frequency and an actual amplitude, and the original audio parameters include an original frequency;
- when determining the direction of relative movement between the receiving terminal and the emitting terminal according to the actual audio parameters and the original audio parameters, the relative movement is determined based on the following:
- determining the direction of relative movement between the receiving terminal and the emitting terminal, according to whether the actual frequency becomes greater or smaller as compared with the original frequency;
- determining the number of times the receiving terminal and the emitting terminal move relatively to each other in the direction of relative movement, according to the number of times that the actual frequency becomes greater or smaller as compared with the original frequency, or according to the number of times that the actual amplitude increases or decreases;
- determining the relative speed of the receiving terminal and the emitting terminal, according to a difference between the actual frequency and the original frequency, or according to a rate at which the actual amplitude increases or decreases.

12. The terminal control method according to claim 1, further comprising, after receiving, by the microphone, the detection audio signal emitted from the speaker and having a frequency within the pre-set detection frequency range:
- determining whether the detection audio signal is a valid detection audio signal by:
- acquiring actual amplitudes of a plurality of detection audio signals, and if the actual amplitude of a target detection audio signal satisfies a pre-set amplitude range, taking the target detection audio signal as the valid detection audio signal; or
- acquiring frequency shift values of a plurality of detection audio signals, and taking a detection audio signal with the largest frequency shift value as the valid detection audio signal.

13. The terminal control method according to claim 12, wherein, in a scenario where the speaker and the microphone are disposed on the same terminal and the same terminal is a foldable terminal to be controlled:
- in a case that the detection audio signal is emitted with a fixed amplitude from the speaker of the terminal to be controlled, the pre-set amplitude range is an actual amplitude range of the detection audio signal when being received by the microphone, under a plurality of folding angles of the terminal to be controlled.

14. The terminal control method according to claim 12, further comprising before determining whether the detection audio signal is a valid detection audio signal:
- when the microphone is in an off-state, detecting whether an audio detection function of the terminal where the microphone is located is triggered to be enabled by a key operation, a gesture operation, or a touch operation; if it is detected that the audio detection function of the terminal where the microphone is located is triggered to be enabled by the key operation, the gesture operation or the touch operation, turning on the microphone to acquire the detection audio signal; and if it is not detected that the audio detection function of the terminal where the microphone is located is triggered to be enabled by a key operation, a gesture operation or a touch operation, keeping the microphone to be turned off; wherein, if the microphone and the speaker are disposed on the same terminal, the speaker and the microphone are simultaneously turned on; or
- monitoring whether a pre-set sensor of the terminal where the microphone is located is in operation or not, and determining whether movement of the terminal where the microphone is located is caused by a movement outside the terminal, according to a signal detected by the pre-set sensor; if the movement of the terminal where the microphone is located is caused by the movement outside the terminal, not turning on the microphone, and if the movement of the terminal where the microphone is located is not caused by the movement outside the terminal, turning on the microphone to acquire the detection audio signal; wherein, if the microphone and the speaker are disposed on the same terminal, the speaker and the microphone are simultaneously turned on.

15. The terminal control method according to claim 14, wherein
- in a case that the pre-set sensor is in operation, determining whether the movement of the terminal where the microphone is located is caused by the movement outside the terminal according to the signal detected by the pre-set sensor comprising:
- acquiring the signal detected by the pre-set sensor, if it is monitored that the pre-set sensor is in operation;
- determining whether the detected signal is continuous and relatively regular;
- if the signal is continuous and relatively regular, determining that the movement of the terminal where the microphone is located is caused by the movement outside the terminal; and
- if the signal is not continuous or irregular, determining that the movement of the terminal where the microphone is located is not caused by the movement outside the terminal.

16. The terminal control method according to claim 2, further comprising, before the speaker emits the detection audio signal:
- acquiring environmental noises outside the speaker, and selecting from the pre-set detection frequency, a frequency different from those of the environmental noises as the frequency of the emitted detection audio signal, if the frequencies of the environmental noises and the pre-set detection frequency are partly coincide.

17. A terminal, comprising: a processor, a memory, and a communication bus;
- wherein the communication bus is configured to implement connection and communication between the processor and the memory;
- the processor is configured to execute at least one program stored in the memory to implement the following steps:
- receiving, by a microphone, a detection audio signal emitted from a speaker and having a frequency within a pre-set detection frequency range;
- acquiring actual audio parameters of the detection audio signal when being received by the microphone, and original audio parameters of the detection audio signal when being emitted from the speaker, wherein the actual audio parameters of the detection audio signal and the original audio parameters of the detection audio signal are configured to determine that the microphone and the speaker are close to each other or the microphone and the speaker are away from each other;

determining a relative state between the microphone and the speaker according to the actual audio parameters and the original audio parameters, wherein the relative state between the microphone and the speaker comprises a relatively stationary state and a relative movement state;

determining a terminal control operation to be performed, according to the relative state and a pre-set correspondence between relative states and terminal control operations; and performing the determined terminal control operation on a terminal where the microphone is located.

18. A non-transitory computer-readable storage medium storing at least one program, the at least one program being executable by at least one processor to implement the following steps:

receiving, by a microphone, a detection audio signal emitted from a speaker and having a frequency within a pre-set detection frequency range;

acquiring actual audio parameters of the detection audio signal when being received by the microphone, and original audio parameters of the detection audio signal when being emitted from the speaker, wherein the actual audio parameters of the detection audio signal and the original audio parameters of the detection audio signal are configured to determine that the microphone and the speaker are close to each other or the microphone and the speaker are away from each other;

determining a relative state between the microphone and the speaker according to the actual audio parameters and the original audio parameters, wherein the relative state between the microphone and the speaker comprises a relatively stationary state and a relative movement state;

determining a terminal control operation to be performed, according to the relative state and a pre-set correspondence between relative states and terminal control operations; and performing the determined terminal control operation on a terminal where the microphone is located.

* * * * *